(12) United States Patent
Inukai et al.

(10) Patent No.: US 9,140,352 B2
(45) Date of Patent: Sep. 22, 2015

(54) DIFFERENTIAL GEAR

(71) Applicant: AISIN AW CO., LTD., Anjo-shi, Aichi-ken (JP)

(72) Inventors: Yoshihiko Inukai, Kariya (JP); Hiroki Ishikawa, Toyoake (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/382,717

(22) PCT Filed: Feb. 20, 2013

(86) PCT No.: PCT/JP2013/054181
§ 371 (c)(1),
(2) Date: Sep. 3, 2014

(87) PCT Pub. No.: WO2013/161365
PCT Pub. Date: Oct. 31, 2013

(65) Prior Publication Data
US 2015/0051041 A1    Feb. 19, 2015

(30) Foreign Application Priority Data
Apr. 26, 2012    (JP) .................................. 2012-100765

(51) Int. Cl.
*F16H 48/08*    (2006.01)
*F16H 55/08*    (2006.01)
*F16H 3/66*    (2006.01)

(52) U.S. Cl.
CPC ............ *F16H 55/0846* (2013.01); *F16H 3/663* (2013.01); *F16H 3/666* (2013.01); *F16H 48/08* (2013.01); *F16H 2048/087* (2013.01); *F16H 2200/006* (2013.01); *F16H 2200/0008* (2013.01); *F16H 2200/0086* (2013.01); *F16H 2200/2007* (2013.01); *F16H 2200/2023* (2013.01); *F16H 2200/2046* (2013.01); *F16H 2200/2082* (2013.01)

(58) Field of Classification Search
CPC   F16H 48/08; F16H 2048/087; F16H 55/0846
See application file for complete search history.

(56) References Cited

U.S. PATENT DOCUMENTS

| | | | | |
|---|---|---|---|---|
| 2,918,831 | A | * | 12/1959 | Wildhaber ..................... 475/234 |
| 3,703,108 | A | * | 11/1972 | McCaw ......................... 475/236 |
| 4,244,243 | A | * | 1/1981 | McCaw ......................... 475/230 |
| 2002/0183158 | A1 | * | 12/2002 | Tsung ............................ 475/230 |
| 2003/0139244 | A1 | | 7/2003 | Wang et al. |
| 2009/0118054 | A1 | | 5/2009 | Nakajima |

FOREIGN PATENT DOCUMENTS

| | | |
|---|---|---|
| JP | A-2002-364728 | 12/2002 |
| JP | A-2005-48903 | 2/2005 |
| JP | A-2005-509813 | 4/2005 |
| JP | A-2009-115142 | 5/2009 |
| JP | A-2009-174584 | 8/2009 |
| JP | A-2011-38546 | 2/2011 |

* cited by examiner

*Primary Examiner* — Huan Le
(74) *Attorney, Agent, or Firm* — Oliff PLC (57) ABSTRACT

A differential gear for a vehicle including a pair of pinion gears and a pair of side gears meshed with the pair of pinion gears at a right angle. In order to improve the strength of the pinion gears and the side gears, less teeth are provided, and the size of each tooth is increased. The reference cone angle and the cone distance may be varied in accordance with the gear ratio, which may make it necessary to increase the size of a differential case that houses the gears. For front-drive vehicles, which is greatly limited in terms of space it may be difficult to suppress an increase in dimension of the differential gear. Accordingly, provided is a compact gearing that has improved strength in the pinion and side gears.

4 Claims, 6 Drawing Sheets

|   |      | C-1 | C-2 | C-3 | C-4 | B-1 | B-2 | F-1 |
|---|------|-----|-----|-----|-----|-----|-----|-----|
| D | 1st  | ○   |     |     |     |     | ●   | ○   |
|   | 2nd  | ○   |     |     |     | ○   |     |     |
|   | 3rd  | ○   |     | ○   |     |     |     |     |
|   | 4th  | ○   |     |     | ○   |     |     |     |
|   | 5th  | ○   | ○   |     |     |     |     |     |
|   | 6th  |     | ○   |     | ○   |     |     |     |
|   | 7th  |     | ○   | ○   |     |     |     |     |
|   | 8th  |     | ○   |     |     | ○   |     |     |
| REV1 |    |     |     | ○   |     |     | ○   |     |
| REV2 |    |     |     |     | ○   |     | ○   |     |

※ ○ : ENGAGED, ● : ENGAGED WITH ENGINE BRAKE IN OPERATION

| | SIDE GEAR | | PINION GEAR | | WHOLE DEPTH | CONE DISTANCE | MODULE | ASSEMBLY DISTANCE | SKIRT THICKNESS | FLATNESS RATE |
|---|---|---|---|---|---|---|---|---|---|---|
| | ADDENDUM | DEDENDUM | ADDENDUM | DEDENDUM | | | | | | |
| EMBODIMENT | 0.731 | 1.34 | 1.136 | 0.935 | 2.071 | 7.906 | 1 | 5.536 | 0.664 | 0.30 |
| MODIFICATION | 0.731 | 1.34 | 1.137 | 0.935 | 2.072 | 7.906 | 1 | 5.426 | 0.543 | 0.31 |
| COMPARATIVE EXAMPLE 1 | 0.731 | 1.34 | 1.136 | 0.935 | 2.071 | 7.906 | 1 | 5.378 | 0.506 | 0.32 |
| COMPARATIVE EXAMPLE 2 | 0.731 | 1.34 | 1.137 | 0.935 | 2.072 | 7.906 | 1 | 5.333 | 0.449 | 0.33 |
| COMPARATIVE EXAMPLE 3 | 0.680 | 1.4 | 1.2 | 0.840 | 2.08 | 7.906 | 1 | 5.852 | 0.554 | 0.26 |
| COMPARATIVE EXAMPLE 4 | 0.688 | 1.458 | 1.262 | 0.885 | 2.146 | 7.906 | 1 | 7.906 | 0 | 0 |
| COMPARATIVE EXAMPLE 5 | 0.831 | 1.354 | 1.229 | 0.939 | 2.185 | 7.906 | 1 | 5.804 | 0.94 | 0.27 |

DIFFERENTIAL GEAR

TECHNICAL FIELD

The present invention relates to a differential gear for a vehicle including a pair of pinion gears and a pair of side gears meshed with the pair of pinion gears at a right angle.

BACKGROUND ART

Hitherto, there has been known a differential gear in which a pair of pinion gears and a pair of side gears which are each a straight bevel gear are meshed with each other (see Patent Document 1, for example). The pinion gears forming the differential gear have ten teeth, and the side gears have 14 teeth. The differential gear is configured such that extensions of the tooth tips of the pinion gears and the side gears pass through the intersection between the axes of the pinion gears and the side gears. This allows the line of simultaneous meshing between the pinion gears and the side gears at the start and the end of meshing therebetween to extend over the entire region from the large-diameter end portion to the small-diameter end portion of the straight bevel gears, which suppresses concentration of a meshing load only in the vicinity of the large-diameter end portion.

RELATED-ART DOCUMENTS

Patent Documents

Patent Document 1: Japanese Patent Application Publication No. 2005-48903 (JP 2005-48903 A)

SUMMARY OF THE INVENTION

In the case where the strength of the pinion gears and the side gears is insufficient in the differential gear according to the related art described above, it is conceivable to further provide a pair of pinion gears to be meshed with the side gears. In the case where such pinion gears are additionally provided, however, the weight and the number of parts of the differential gear may be increased. On the other hand, the strength of the pinion gears and the side gears can be improved by reducing the number of teeth of each gear and increasing the size of the teeth of each gear. In the case where the number of teeth of the pinion gears and the side gears is reduced, however, the reference cone angle and the cone distance of the pinion gears and the side gears may be varied in accordance with the gear ratio, which may make it necessary to increase the size of a differential case that houses the pinion gears and the side gears. For a differential gear for front-drive vehicles, which is greatly limited in terms of space in the vehicle-width direction in order to avoid interference with a transmission case, in particular, it may be difficult to suppress an increase in dimension of the differential gear in the vehicle-width direction while securing the strength of the side gears if the reference cone angle of the side gears is decreased with the reference cone angle of the pinion gears increased by reducing the number of teeth of the pinion gears and the side gears.

It is therefore a main object of the present invention to make a differential gear compact while improving the strength of pinion gears and side gears.

In order to achieve the foregoing main object, the differential gear according to the present invention adopts the following means.

The present invention provides
a differential gear for a vehicle including a pair of pinion gears and a pair of side gears meshed with the pair of pinion gears at a right angle, characterized in that:
the pinion gears are each a straight bevel gear with nine teeth, and the side gears are each a straight bevel gear with 13 teeth; and
when the cone distance of the pinion gears is defined as "R",
the module of the pinion gears and the side gears is defined as "M",
the whole depth of the pinion gears and the side gears is defined as "h",
the outer radius of the pinion gears is defined as "Rp",
the tooth root cone angle of the side gears is defined as "θ",
the clearance between an outer end portion of the pinion gears in the radial direction and a skirt portion of the side gears that faces the outer end portion is defined as "CL",
the thickness of the skirt portion is defined as "St",
the assembly distance is defined as "MD=Rp+CL+St", and
the flatness rate is defined as "F=(R−MD)/R" (the modules and the dimensions being represented in units of "mm"),
the following relationship is met:

$$0.28 \leq F \leq 0.31,$$

$$MD \geq R \times \cos(\theta),$$

$$St/M \geq 0.534,$$

$$0.025 \leq CL/M \leq 0.038, \text{ and}$$

$$h/M \geq 2.$$

The differential gear is obtained by meshing two pinion gears, which are each a straight bevel gear with nine teeth, and two side gears, which are each a straight bevel gear with 13 teeth, with each other at a right angle. The differential gear is configured to meet $0.28 \leq F=(R-MD)/R \leq 0.31$, $MD=Rp+CL+St \geq R \times \cos(\theta)$, $St/M \geq 0.534$, $0.025 \leq CL/M \leq 0.038$, and $h/M \geq 2$. In the formulas, "R" is the cone distance of the pinion gears, that is, the distance from the intersection between the rotational center axis of the pinion gears and the rotational center axis of the side gears to the outermost end of the pinion gears on the pitch line of the pinion gears, "M" is the module of the pinion gears and the side gears, that is, the module at the large end face ($M=2 \leq R \times \sin(\phi))/zs$, where "φ" is the reference cone angle of the side gears and "zs" is the number of teeth of the side gears), "h" is the whole depth of the pinion gears and the side gears, that is, the whole depth of the pinion gears and the side gears at the outermost end on the pitch line of the pinion gears, "Rp" is the outer radius of the pinion gears, that is, the distance from the rotational center axis of the pinion gears to the outer end portion of the pinion gears in the radial direction (the outermost end of the pinion gears in the radial direction), "θ" is the tooth root cone angle of the side gears, "CL" is the clearance between the outer end portion of the pinion gears in the radial direction and the skirt portion of the side gears which faces the outer end portion, and "St" is the thickness of the skirt portion.

Here, the flatness rate F is an index defined by the inventors to evaluate the size of the differential gear in the vehicle-width direction, and is higher as the assembly distance MD, that is, the dimension of the differential gear in the vehicle-width direction (the axial direction of the side gears) is smaller. The differential gear can be made compact, that is, made compact in the axial direction of the side gears, while improving the strength of the pinion gears and the side gears if the flatness rate F has a value in the range of 0.28 to 0.31.

Further, if the differential gear is configured to meet the relationship "assembly distance MD≥cone distance R×cos(θ)" with the flatness rate F having a value in the range of 0.28 to 0.31, the tooth root angle (φ-θ) of the side gears, that is, the dedendum of the pinion gears, can be increased to a certain degree, which makes it possible to suppress an increase in axial length of the outer end portion of the pinion gears in the radial direction, that is, radial length of the skirt portion of the side gears which faces the outer end portion of the pinion gears in the radial direction, thereby more favorably securing the rigidity of the skirt portion. In addition, if the differential gear is configured to meet St/M≥0.534, 0.025≤CL/M≤0.038, and h/M≥2, favorable meshing between the pinion gears and the side gears can be achieved by securing practically sufficient values of the clearance CL and the whole depth h of the pinion gears and the side gears, sufficient rigidity of the skirt portion can be secured, and the strength of the side gears and hence the differential gear can be favorably secured by suppressing deformation of the tooth root of the side gears due to a stress caused when the pinion gears and the side gears are meshed with each other.

In the differential gear, when the reference cone angle of the side gears is defined as "φ", the addendum of the pinion gears is defined as "Ap", and the addendum of the side gears is defined as "As", the relationship "Rp≥R×cos(φ+(Ap/2−As/2)×sin(φ)" may be met. Consequently, the outer radius Rp of the pinion gears is equal to or more than the distance between the rotational center axis of the pinion gears and a point at half the effective meshing tooth height (Ap+As) of the pinion gears and the side gears, and the outer end portion of the pinion gears in the radial direction intersects the point at half the effective meshing tooth height (Ap+As) or is positioned on the outer side with respect to the point at half the effective meshing tooth height (Ap+As). As a result, it is possible to suppress an increase in axial length of the outer end portion of the pinion gears in the radial direction, that is, radial length of the skirt portion of the side gears which faces the outer end portion of the pinion gears in the radial direction, thereby more favorably securing the rigidity of the skirt portion.

The differential gear may be coupled to an output shaft of a transmission for a front-drive vehicle via a gear train. That is, the differential gear according to the present invention can make the side gears compact in the axial direction while improving the strength of the pinion gears and the side gears, and is significantly suitable in particular for front-drive vehicles which are greatly limited in terms of space in the vehicle-width direction, that is, in the axial direction of the side gears.

MODES FOR CARRYING OUT THE INVENTION

Now, an embodiment of the present invention will be described below.

Figure 1:
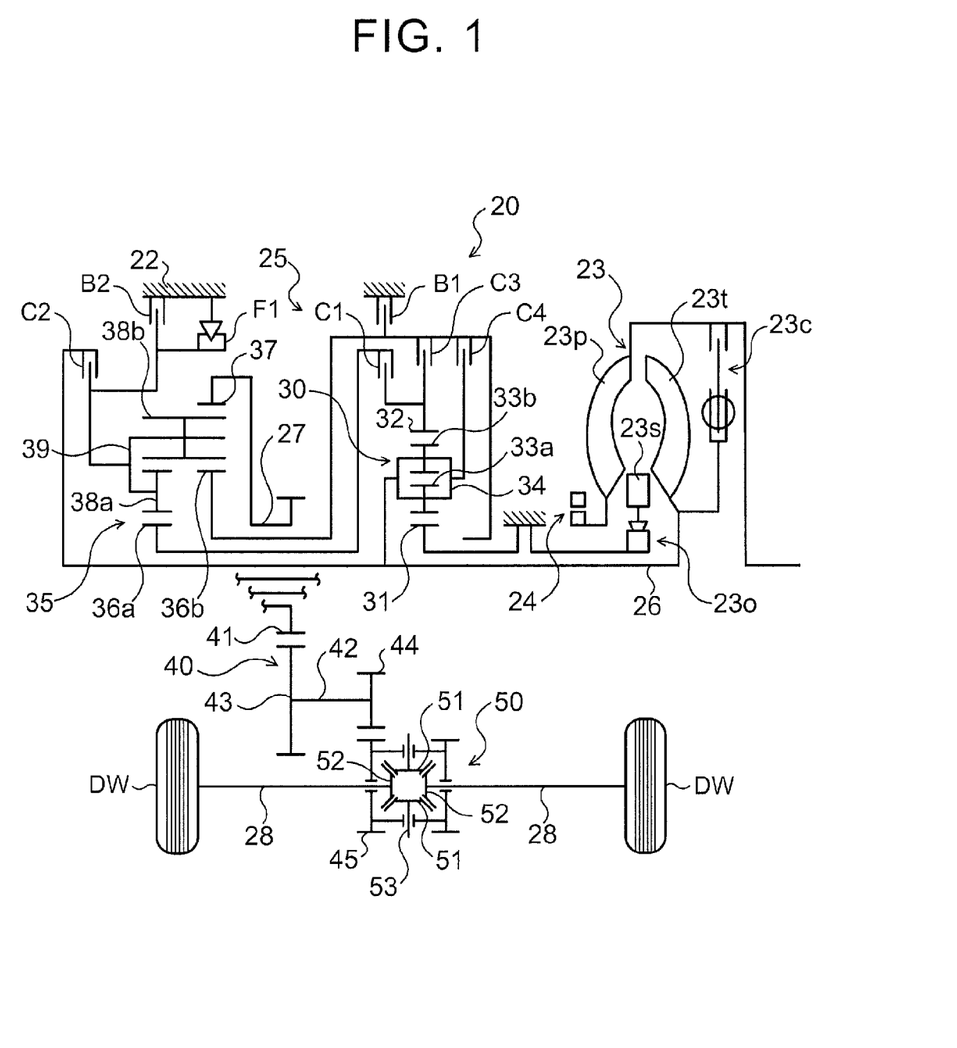
FIG. 1 illustrates a schematic configuration of a power transfer device 20 including a differential gear 50 according to an embodiment of the present invention.

FIG. 1 illustrates a schematic configuration of a power transfer device 20 including a differential gear 50 according to an embodiment of the present invention. The power transfer device 20 illustrated in the drawing is connected to a crankshaft of an engine (not illustrated) mounted on a front-drive vehicle, and can transmit power from the engine to left and right drive wheels (front wheels) DW. As illustrated in the drawing, the power transfer device 20 includes a transmission case 22, a fluid transmission apparatus (torque converter) 23 housed inside the transmission case 22, an oil pump 24, an automatic transmission 25, a gear mechanism (gear train) 40, the differential gear (differential mechanism) 50, and so forth.

The fluid transmission apparatus 23 is structured as a torque converter including a pump impeller 23p on the input side connected to the crankshaft of the engine, a turbine runner 23t on the output side connected to an input shaft 26 of the automatic transmission 25, a stator 23s disposed on the inner side of the pump impeller 23p and the turbine runner 23t to rectify the flow of working oil from the turbine runner 23t to the pump impeller 23p, a one-way clutch 23o that restricts rotation of the stator 23s to one direction, a lock-up clutch 23c, and so forth. It should be noted, however, that the fluid transmission apparatus 23 may be structured as a fluid coupling that does not include the stator 23s. The oil pump 24 is structured as a gear pump including a pump assembly composed of a pump body and a pump cover, and an externally toothed gear connected to the pump impeller 23p of the fluid transmission apparatus 23 via a hub. The oil pump 24 is driven by power from the engine to suction working oil (ATF) reserved in an oil pan (not illustrated) and pump the working oil to a hydraulic control device (not illustrated).

The automatic transmission 25 is structured as an 8-speed transmission. As illustrated in FIG. 1, the automatic transmission 25 includes, in addition to the input shaft 26 and an output shaft 27, a double-pinion type first planetary gear mechanism 30, a Ravigneaux type second planetary gear mechanism 35, and four clutches C1, C2, C3, and C4, two brakes B1 and B2, and a one-way clutch F1 that change a power transfer path from the input side to the output side. The output shaft 27 of the automatic transmission 25 is formed to be hollow, and coupled to the left and right drive wheels DW via the gear mechanism 40, the differential gear 50, and a drive shaft 28.

The first planetary gear mechanism 30 includes a sun gear 31 which is an externally toothed gear, a ring gear 32 which is an internally toothed gear disposed concentrically with the sun gear 31, and a planetary carrier 34 that rotatably and revolvably holds a plurality of sets of two pinion gears 33a and 33b meshed with each other, one of the pinion gears 33a and 33b being meshed with the sun gear 31 and the other being meshed with the ring gear 32. As illustrated in the drawing, the sun gear 31 of the first planetary gear mechanism 30 is stationary with respect to the transmission case 22, and the planetary carrier 34 of the first planetary gear mechanism 30 is connected so as to be rotatable together with the input shaft 26. In addition, the first planetary gear mechanism 30 is structured as a so-called speed reduction gear, and reduces the speed of power transferred to the planetary carrier 34, which is an input element, to output the power to the ring gear 32, which is an output element.

The second planetary gear mechanism 35 includes a first sun gear 36a and a second sun gear 36b which are each an externally toothed gear, a ring gear 37 which is an internally toothed gear disposed concentrically with the first and second sun gears 36a and 36b, a plurality of short pinion gears 38a meshed with the first sun gear 36a, a plurality of long pinion gears 38b meshed with the second sun gear 36b and the plurality of short pinion gears 38a and meshed with the ring gear 37, and a planetary carrier 39 that rotatably and revolvably holds the plurality of short pinion gears 38a and the plurality of long pinion gears 38b. The ring gear 37 of the second planetary gear mechanism 35 is connected to the output shaft 27, and the planetary carrier 39 of the second planetary gear mechanism 35 is supported by the transmission case 22 via the one-way clutch F1.

The clutch C1 is a hydraulic clutch (friction engagement element) capable of engaging and disengaging the ring gear 32 of the first planetary gear mechanism 30 and the first sun gear 36a of the second planetary gear mechanism 35 with and from each other. The clutch C2 is a hydraulic clutch capable of engaging and disengaging the input shaft 26 and the planetary carrier 39 of the second planetary gear mechanism 35 with and from each other. The clutch C3 is a hydraulic clutch capable of engaging and disengaging the ring gear 32 of the first planetary gear mechanism 30 and the second sun gear 36b of the second planetary gear mechanism 35 with and from each other. The clutch C4 is a hydraulic clutch capable of engaging and disengaging the planetary carrier 34 of the first planetary gear mechanism 30 and the second sun gear 36b of the second planetary gear mechanism 35 with and from each other. The brake B1 is a hydraulic brake (friction engagement element) capable of making the second sun gear 36b of the second planetary gear mechanism 35 stationary and rotatable with respect to the transmission case 22. The brake B2 is a hydraulic brake capable of making the planetary carrier 39 of the second planetary gear mechanism 35 stationary and rotatable with respect to the transmission case 22.

Figure 2:
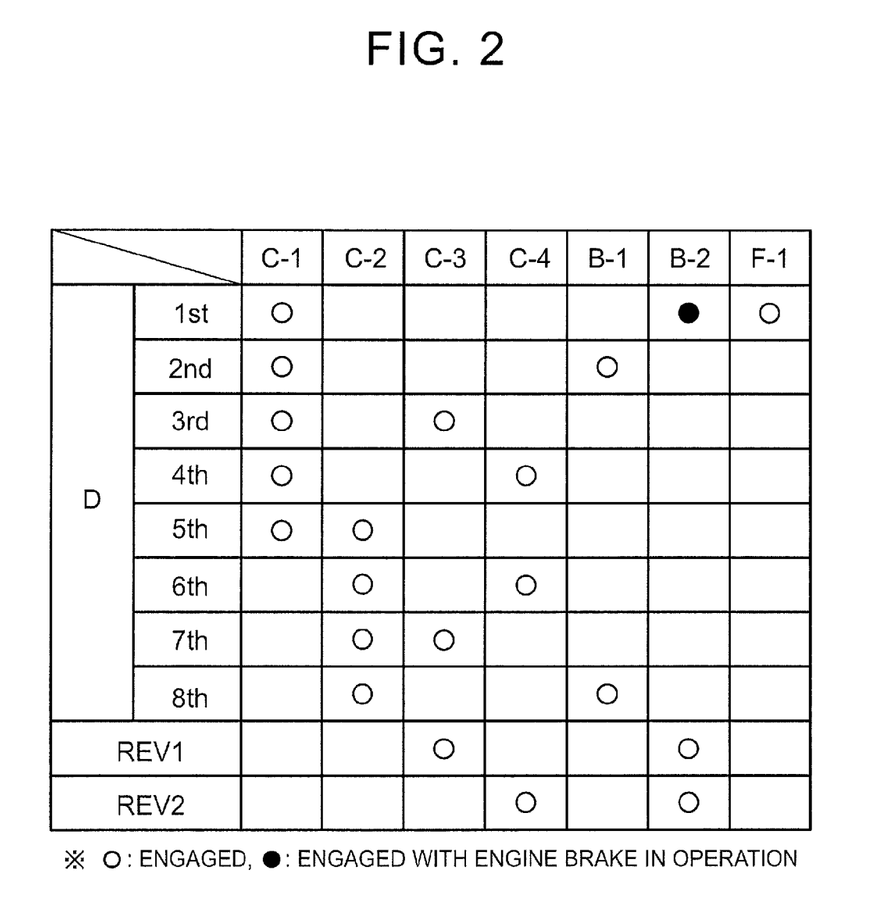
FIG. 2 is an operation table illustrating the relationship between each shift speed of an automatic transmission 25 included in the power transfer device 20 and the respective operating states of clutches and brakes.

The clutches C1 to C4 and the brakes B1 and B2 operate with working oil supplied thereto and discharged therefrom by the hydraulic control device (not illustrated). FIG. 2 is an operation table illustrating the relationship between each shift speed of the automatic transmission 25 and the respective operating states of the clutches C1 to C4, the brakes B1 and B2, and the one-way clutch F1. The automatic transmission 25 provides first to eighth forward speeds and first and second reverse speeds when the clutches C1 to C4 and the brakes B1 and B2 are brought into the respective states illustrated in the operation table of FIG. 2. At least one of the clutches C1 to C4 and the brakes B1 and B2 may be a meshing engagement element such as a dog clutch.

The gear mechanism 40 includes a counter drive gear 41 fixed to the output shaft 27 of the automatic transmission 25, a counter driven gear 43 fixed to a counter shaft 42 that extends in parallel with the output shaft 27 and meshed with the counter drive gear 41, a drive pinion gear (final drive gear) 44 formed on (or fixed to) the counter shaft 42, and a differential ring gear (final driven gear) 45 meshed with the drive pinion gear 44 and coupled to the differential gear 50.

Figure 3:
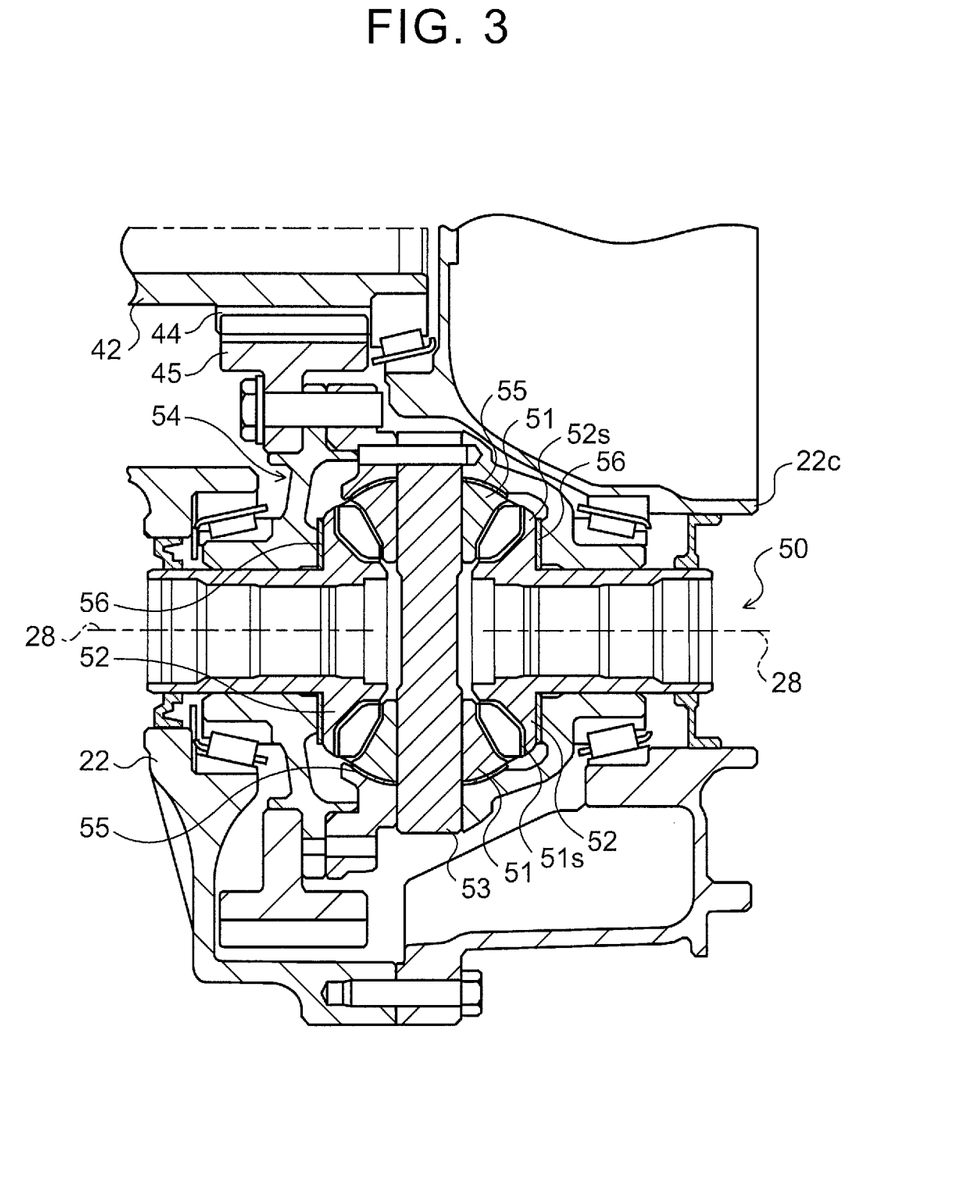
FIG. 3 is a sectional view of the differential gear 50.
Figure 4:
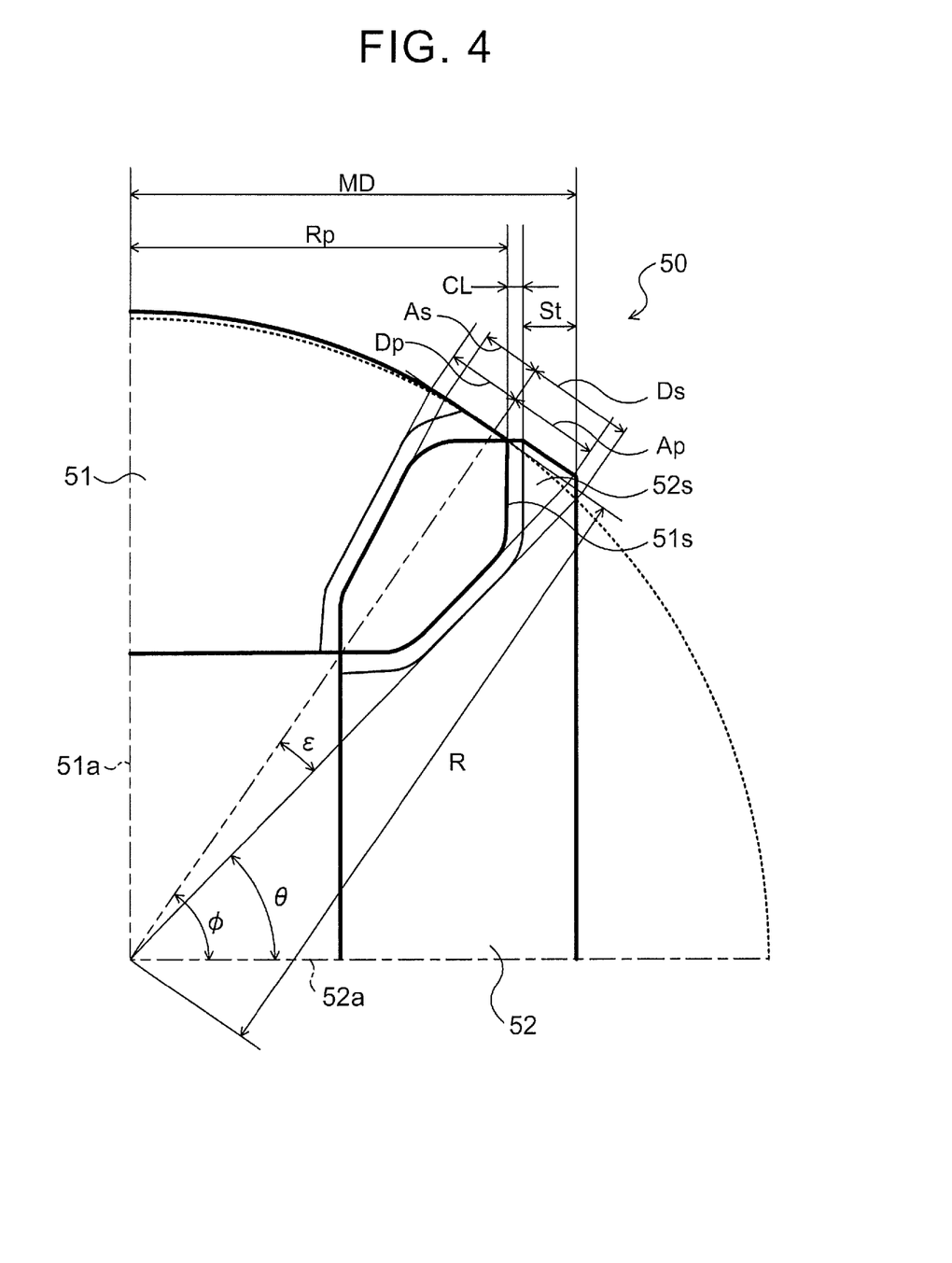
FIG. 4 is a schematic diagram illustrating the configuration of the differential gear 50.

As illustrated in FIGS. 1 and 3, the differential gear 50 includes a pair of (two) pinion gears 51, a pair of (two) side gears 52 fixed to the drive shaft 28 and meshed with the pair of pinion gears 51 at a right angle, a pinion shaft 53 that supports the pair of pinion gears 51, and a differential case 54 which houses the pair of pinion gears 51 and the pair of side gears 52 and to which the differential ring gear 45 discussed above is coupled (fixed). In the embodiment, the pinion gears 51 and the side gears 52 are each structured as a straight bevel gear. In addition, as illustrated in FIGS. 3 and 4, the side gears 52 each include a skirt portion 52s provided between adjacent teeth to face an outer end portion 51s of the pinion gears 51 (teeth) in the radial direction. Further, a pinion washer 55 is disposed between each of the pinion gears 51 and the differential case 54, and a side washer 56 is disposed between each of the side gears 52 and the differential case 54. As illustrated in FIG. 3, the differential case 54 is rotatably supported by the transmission case 22 via a bearing coaxially with the drive shaft 28.

Here, in the differential gear 50 structured as discussed above, the strength of the pinion gears 51 and the side gears 52 can be improved by reducing the number of teeth of the pinion gears 51 and the side gears 52 and increasing the size of the teeth of each gear. Therefore, in the differential gear 50 according to the embodiment, the number of teeth of the pinion gears 51 is "9", which is smaller than the number of teeth (for example, 10) of pinion gears of a common differential gear, and the number of teeth of the side gears 52 is "13", which is smaller than the number of teeth (for example, 14 to 16) of side gears of a common differential gear.

It should be noted, however, that in the case where the number of teeth of the pinion gears 51 and the side gears 52 is simply reduced, the reference cone angle and the cone distance of the pinion gears 51 and the side gears 52 may be varied in accordance with the gear ratio, and if the reference cone angle of the side gears 52 is decreased while the reference cone angle of the pinion gears 51 is increased, it may be difficult to suppress an increase in dimension of the differential gear 50 (side gears 52) in the vehicle-width direction while securing the strength of the side gears 52. In addition, in the power transfer device 20 for front-drive vehicles, as illustrated in FIG. 3, the differential gear 50 is disposed in proximity to a converter housing 22c that forms the transmission case 22 and that houses the fluid transmission apparatus 23. Therefore, the power transfer device 20 is greatly limited in terms of space in the vehicle-width direction in order to avoid interference with the converter housing 22c, and the size of the differential case 54 may not be increased easily.

In the light of the foregoing, as illustrated in FIG. 4, when "R" is defined as the cone distance of the pinion gears 51, that is, the distance from the intersection between a rotational center axis 51a of the pinion gears 51 and a rotational center axis 52a of the side gears 52 to the outermost end of the pinion gears 51 on the pitch line of the pinion gears 51 (see the dash-double-dot line in FIG. 4), "M" is defined as the module of the pinion gears 51 and the side gears 52, that is, the module at the large end face (M=2×R×sin ($\phi$)/zs, where "($\phi$)" is the reference cone angle of the side gears 52 and "zs" is the number of teeth (=13) of the side gears 52), "h" is defined as the whole depth of the pinion gears 51 and the side gears 52, that is, the whole depth of the pinion gears 51 and the side gears 52 at the outermost end on the pitch line of the pinion gears 51, "Rp" is defined as the outer radius of the pinion gears 51, that is, the distance from the rotational center axis 51a of the pinion gears 51 to the outer end portion 51s of the pinion gears in the radial direction (the outermost end of the pinion gears in the radial direction), "θ" is defined as the tooth root cone angle of the side gears 52, "CL" is defined as the clearance between the outer end portion 51s of the pinion gears 51 in the radial direction and the skirt portion 52s of the side gears 52, "St" is defined as the thickness of the skirt portion 52s, the assembly distance is defined as "MD=Rp+CL+St", and the flatness rate is defined as "F=(R−MD)/R"

(the module and the dimensions being represented in units of "mm"), the differential gear 50 according to the embodiment is configured to meet the following formulas:

$$0.28 \leq F \leq 0.31,$$

$$MD \geq R \times \cos(\theta),$$

$$St/M \geq 0.534,$$

$$0.025 \leq CL/M \leq 0.038, \text{ and}$$

$$h/M \geq 2$$

Here, the flatness rate F is an index defined by the inventors to evaluate the size of the differential gear in the vehicle-width direction, and is higher as the assembly distance MD, that is, the dimension of the differential gear 50 in the vehicle-width direction (the axial direction of the side gears 52) is smaller.

Further, as illustrated in FIG. 4, when the reference cone angle of the side gears 52 is defined as "φ", the addendum of the pinion gears 51 is defined as "Ap", and the addendum of the side gears 52 is defined as "As", the differential gear 50 according to the embodiment is configured to meet the following formula:

$$Rp \geq R \times \cos(\phi) + (Ap/2 - As/2) \times \sin(\phi)$$

Figure 5:
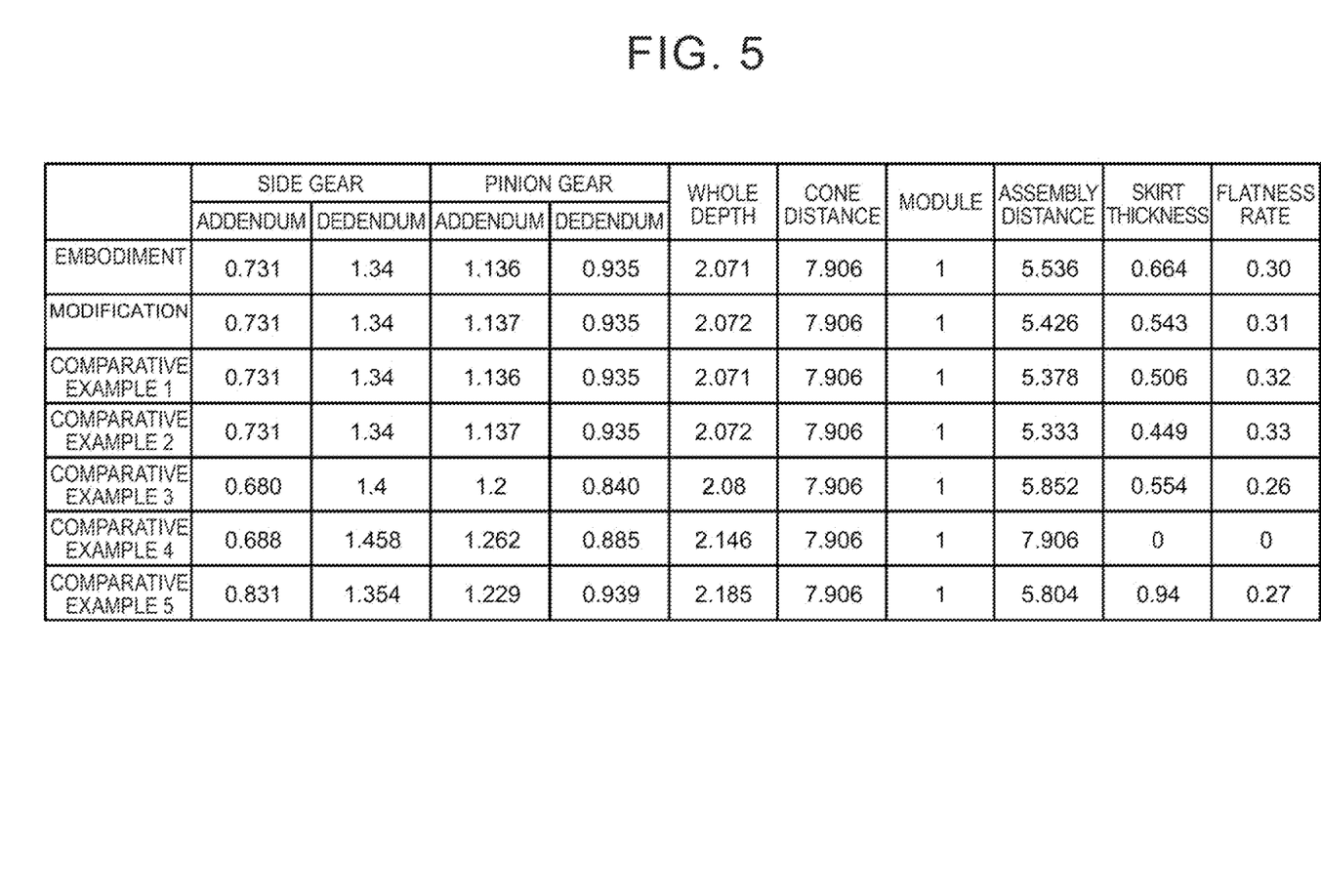
FIG. 5 is a table indicating the specifications of the differential gear 50 according to the embodiment, a differential gear 50B according to a modification, and differential gears according to Comparative Examples 1 to 5.
Figure 6:
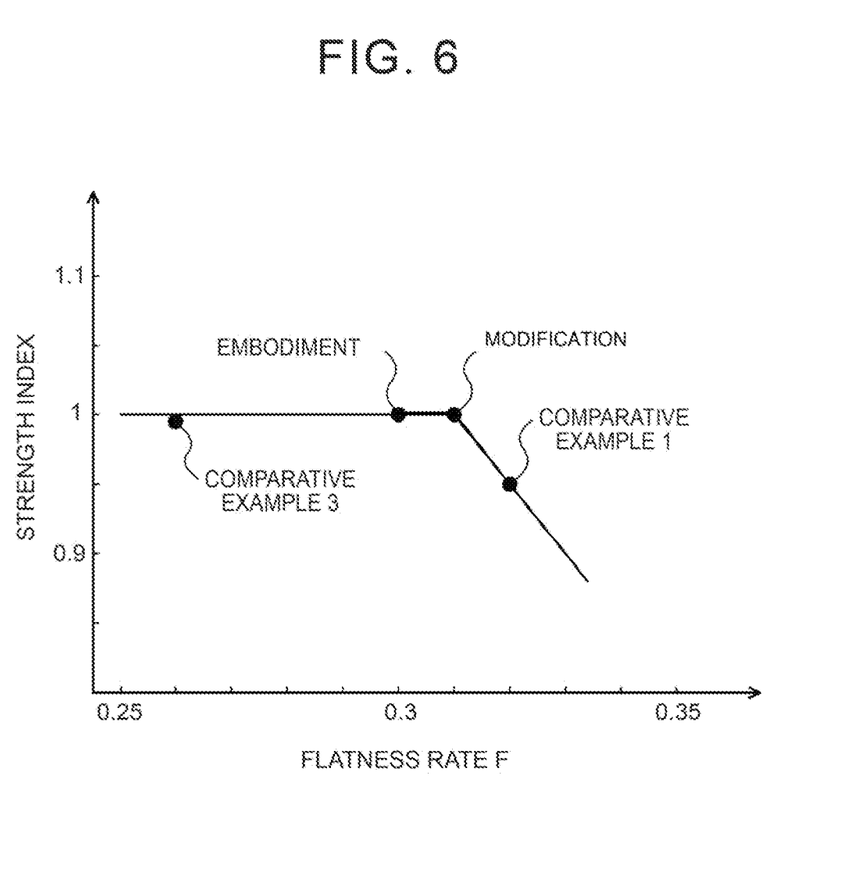
FIG. 6 is a graph indicating the results of a strength test for the differential gear 50 according to the embodiment, the differential gear 50B according to the modification, and the differential gears according to Comparative Examples 1 and 3.

FIG. 5 is a table indicating the specifications of the differential gear 50 according to the embodiment described above, a differential gear 50B according to a modification, and differential gears according to Comparative Examples 1 to 5. FIG. 5 indicates specifications such as the addendum and the dedendum of the pinion gears and the side gears in each differential gear, the whole depth, the cone distance, the assembly distance, and the thickness of the skirt portion as divided by the module M to be made dimensionless. Therefore, in FIG. 5, the module of each differential gear is "1". In addition, as seen from the assembly distance and the thickness of the skirt portion indicated in FIG. 5, the differential gear 50B according to the modification is slightly smaller than the differential gear 50 according to the embodiment, and has been adapted to 6-speed automatic transmissions. Further, Comparative Examples 1 to 3 correspond to differential gears for front-drive vehicles as with the differential gear 50 according to the embodiment and the differential gear 50B according to the modification, and Comparative Examples 4 and 5 correspond to differential gears for rear-drive vehicles. FIG. 6 indicates the results of a strength evaluation test for the differential gear 50 according to the embodiment, the differential gear 50B according to the modification, and the differential gears according to Comparative Examples 1 and 3. The drawing indicates the results of evaluating the fatigue strength of each differential gear (the pinion gears and the side gears) after long hours of operation of the differential gear with both the side gears differentially operating. If the strength index represented by the vertical axis of FIG. 6 has a value of 1, that indicates that the differential gear has practically sufficient and favorable strength.

As seen from the evaluation results of FIG. 6, the differential gear according to Comparative Example 1 with a flatness rate F of more than 0.31 can be reduced in size in the vehicle-width direction (see the assembly distance and the thickness of the skirt portion in FIG. 5), but is insufficient in terms of the strength. In addition, the differential gear according to Comparative Example 3 with a flatness rate of 0.26 has sufficient strength, but has an assembly distance that is larger than that of the differential gear 50 according to the embodiment, the differential gear 50B according to the modification, and the differential gear according to Comparative Example 1 as seen from FIG. 5, and can be made compact in the vehicle-width direction only to a limited degree. Moreover, the differential gear according to Comparative Example 5 with a flatness rate of 0.27, which is a differential gear for rear-drive vehicles which have extra space, has sufficiently large thickness of the skirt portion (see FIG. 5) and is considered to have sufficient strength, but clearly can be made compact in the vehicle-width direction only to a limited degree because of the assembly distance MD and the thickness of the skirt portion. From these evaluation results, it can be understood that the differential gear can be made compact while improving the strength of the pinion gears and the side gears if the flatness rate of the differential gear is selected from the range of 0.28 to 0.31. In the light of this, the differential gear 50 according to the embodiment has a flatness rate F of 0.30, and the differential gear 50B according to the modification has a flatness rate F of 0.31.

Further, if the differential gear 50, 50B is configured to meet the relationship "assembly distance MD ≥ cone distance R×cos (θ)" with the flatness rate F having a value in the range of 0.28 to 0.31, the tooth root angle ε (=φ−θ) of the side gears 52, that is, the dedendum Dp of the pinion gears 51, can be increased to a certain degree, which makes it possible to suppress an increase in axial length of the outer end portion 51s of the pinion gears 51 in the radial direction, that is, radial length of the skirt portion 52s of the side gears 52 which faces the outer end portion 51s of the pinion gears 51 in the radial direction, thereby more favorably securing the rigidity of the skirt portion 52s. In addition, if the differential gear is configured to meet St/M≥0.534, 0.025≤CL/M≤0.038, and h/M≥2, favorable meshing between the pinion gears 51 and the side gears 52 can be achieved by securing practically sufficient values of the clearance CL and the whole depth h of the pinion gears 51 and the side gears 52, sufficient rigidity of the skirt portion 52s can be secured, and the strength of the side gears 52 and hence the differential gear 50, 50B can be favorably secured by suppressing deformation of the tooth root of the side gears 52 due to a stress caused when the pinion gears 51 and the side gears 52 are meshed with each other.

Moreover, as discussed above, when the addendum of the pinion gears 51 is defined as "Ap", and the addendum of the side gears is defined as "As", the differential gear 50 according to the embodiment and the differential gear 50B according to the modification are configured to meet the relationship "Rp≥R×cos (φ)+(Ap/2−As/2)×sin (φ)". Consequently, the outer radius Rp of the pinion gears 51 is equal to or more than the distance between the rotational center axis 51a of the pinion gears 51 and a point at half the effective meshing tooth height (Ap+As) of the pinion gears 51 and the side gears 52, and the outer end portion 51s of the pinion gears 51 in the radial direction intersects the point at half the effective meshing tooth height (Ap+As) or is positioned on the outer side with respect to the point at half the effective meshing tooth height (Ap+As). As a result, it is possible to suppress an increase in axial length of the outer end portion 51s of the pinion gears 51 (teeth) in the radial direction, that is, radial length of the skirt portion 52s of the side gears 52 which faces the outer end portion 51s of the pinion gears 51 in the radial direction, thereby more favorably securing the rigidity of the skirt portion 52s.

As has been described above, the differential gear 50 according to the embodiment and the differential gear 50B according to the modification can make the side gears 52 compact in the axial direction while improving the strength of the pinion gears 51 and the side gears 52, and are significantly suitable in particular for front-drive vehicles which are greatly limited in terms of space in the vehicle-width direction, that is, in the axial direction of the side gears 52. It is a matter of course, however, that the differential gear 50, 50B may also be applied to rear-drive vehicles.

The correspondence between the main elements of the embodiment etc. and the main elements of the invention described in the "SUMMARY OF THE INVENTION" section does not limit the elements of the invention described in the "Means for Solving the Problem" section, because the embodiment etc. are examples given for the purpose of specifically describing a mode for carrying out the invention described in the "SUMMARY OF THE INVENTION" section. That is, the embodiment etc. are merely specific examples of the invention described in the "SUMMARY OF THE INVENTION" section, and the invention described in the "SUMMARY OF THE INVENTION" section should be construed on the basis of the description in that section.

While a mode for carrying out the present invention has been described above by way of an embodiment, it is a matter of course that the present invention is not limited to the embodiment in any way, and that the present invention may be modified in various ways without departing from the scope and sprit of the present invention.

INDUSTRIAL APPLICABILITY

The present invention can be utilized in the power transfer device manufacturing industry.

The invention claimed is:

1. A differential gear for a vehicle including a pair of pinion gears and a pair of side gears meshed with the pair of pinion gears at a right angle, characterized in that:

the pinion gears are each a straight bevel gear with nine teeth, and the side gears are each a straight bevel gear with thirteen teeth; and a cone distance of the pinion gears is defined as "$R$", a module of the pinion gears and the side gears is defined as "$M$", a whole depth of the pinion gears and the side gears is defined as "$h$", an outer radius of the pinion gears is defined as "$Rp$", a tooth root cone angle of the side gears is defined as "$\theta$", a clearance between an outer end portion of the pinion gears in a radial direction and a skirt portion of the side gears that faces the outer end portion is defined as "$CL$", a thickness of the skirt portion is defined as "$St$", an assembly distance is defined as "$MD=Rp+CL+St$", and a flatness rate is defined as "$F=(R-MD)/R$" (the modules and the dimensions being represented in units of "mm"), the following relationships are met:

$$0.28 \leq F \leq 0.31,$$

$$MD \geq R \times \cos(\theta),$$

$$St/M \geq 0.534,$$

$$0.025 \leq CL/M \leq 0.038, \text{ and}$$

$$h/M \geq 2.$$

2. The differential gear according to claim 1, which is coupled to an output shaft of a transmission for a front-drive vehicle via a gear train.

3. The differential gear according to claim 1, wherein a reference cone angle of the side gears is defined as "$\phi$", an addendum of the pinion gears is defined as "$Ap$", and an addendum of the side gears is defined as "$As$", the following relationship is met:

$$Rp \geq R \times \cos(\phi) + (Ap/2 - As/2) \times \sin(\phi).$$

4. The differential gear according to claim 3, which is coupled to an output shaft of a transmission for a front-drive vehicle via a gear train.

* * * * *